May 2, 1939. A. CARLINI 2,156,582
TURNING TABLE JACK FOR AUTOMOBILES
Filed May 26, 1937 4 Sheets-Sheet 1
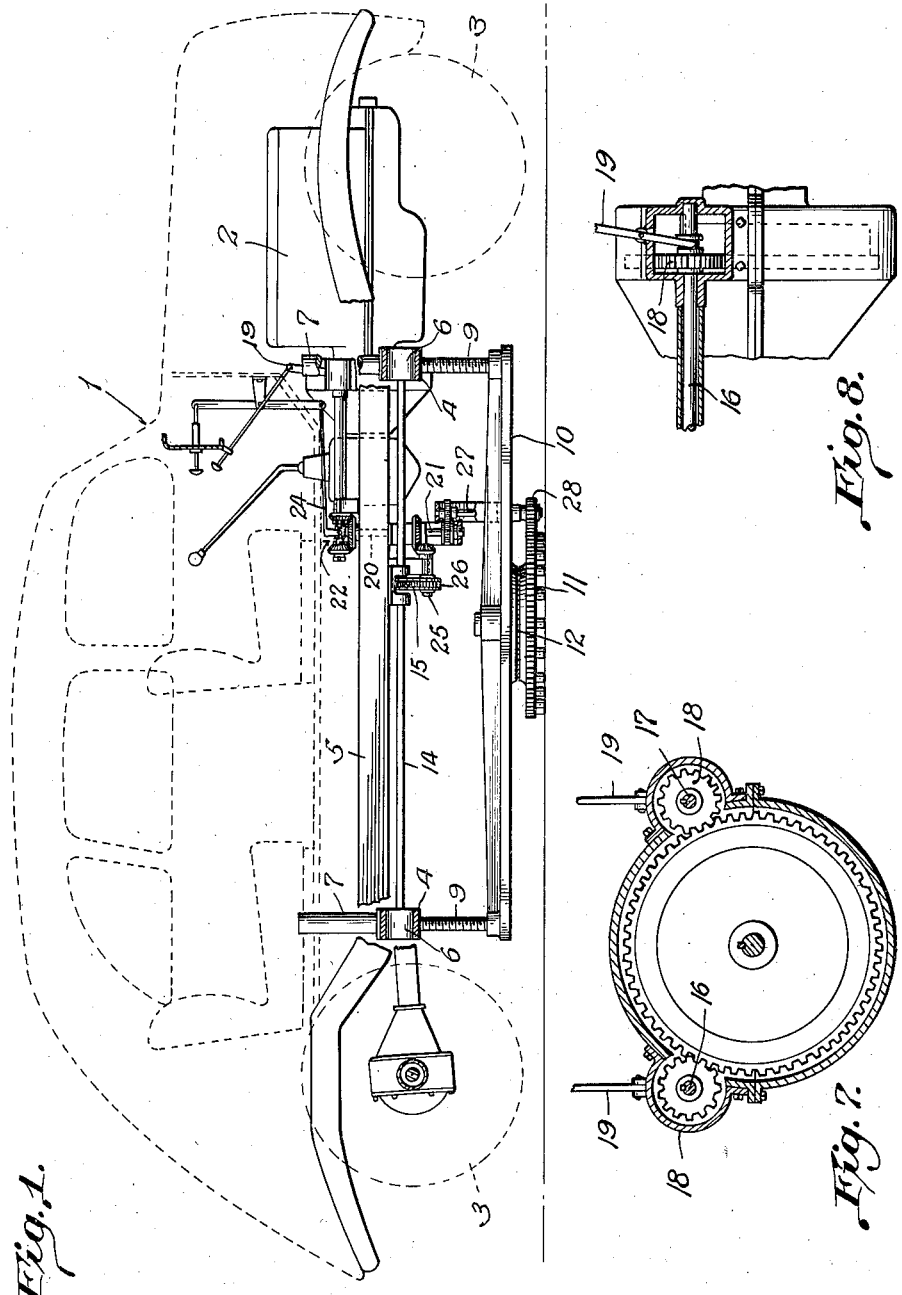
Alfonso Carlini,
INVENTOR
BY Victor J. Evans & Co.
ATTORNEYS May 2, 1939. A. CARLINI 2,156,582
TURNING TABLE JACK FOR AUTOMOBILES
Filed May 26, 1937 4 Sheets-Sheet 2
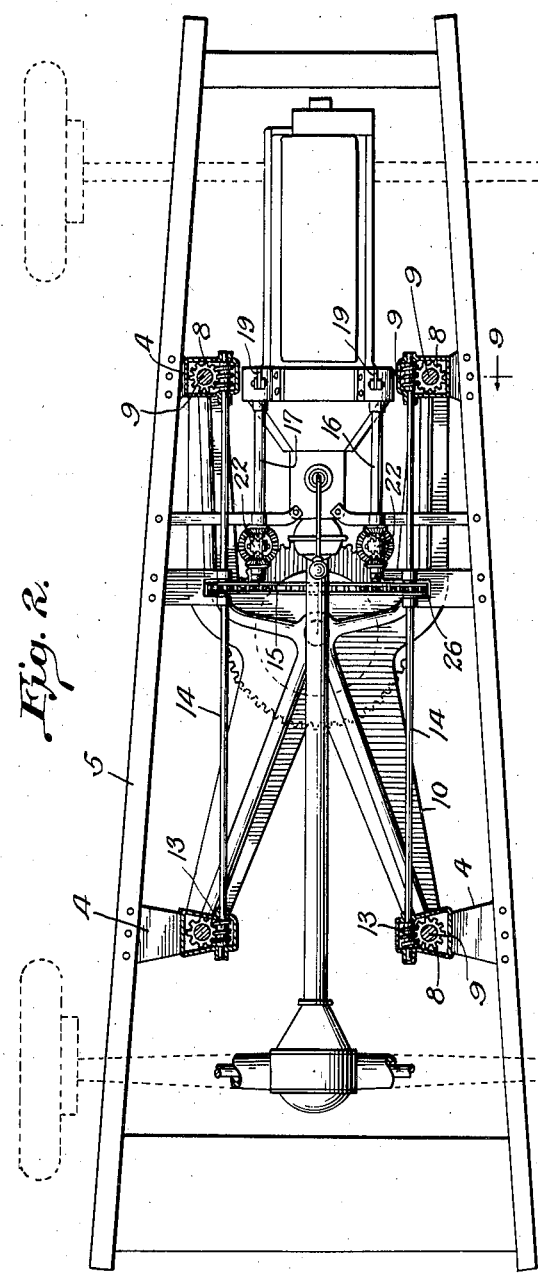
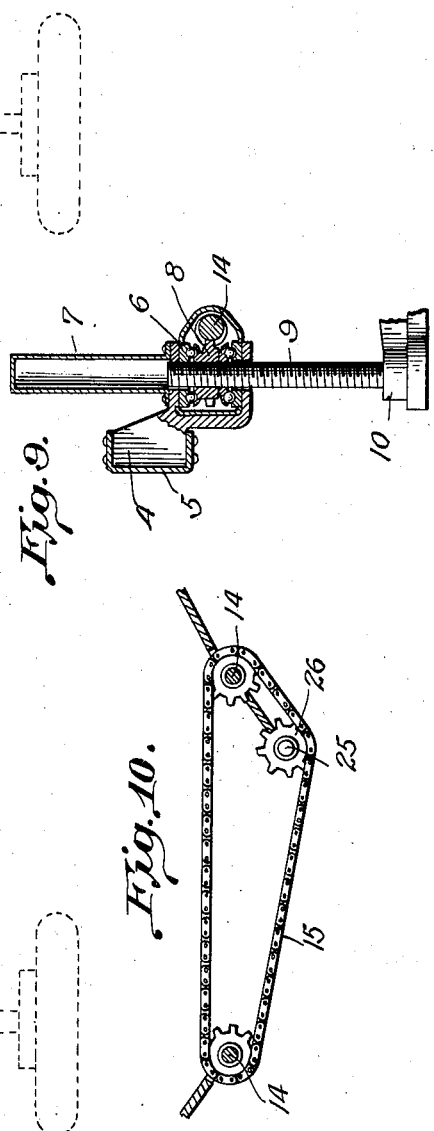
Alfonso Carlini,
INVENTOR
BY Victor J. Evans & Co.
ATTORNEYS

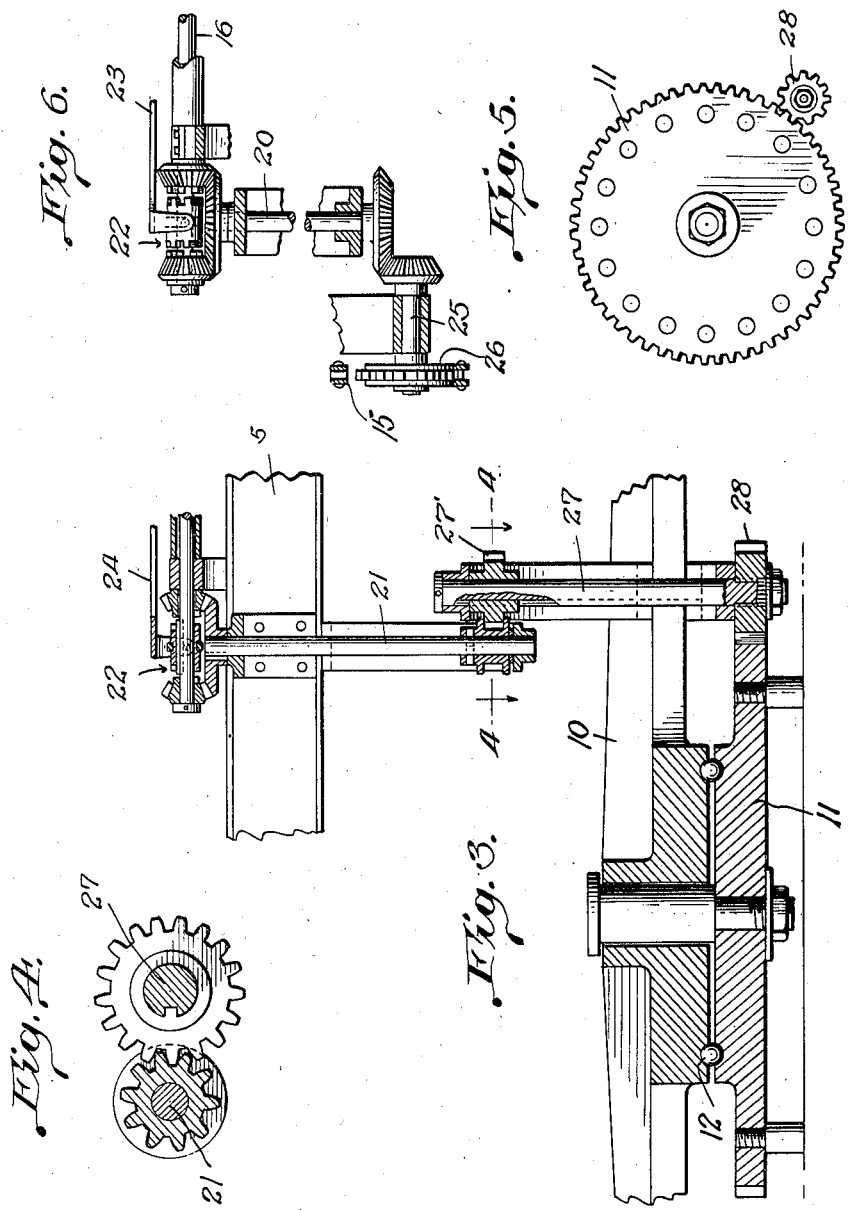

May 2, 1939. A. CARLINI 2,156,582
TURNING TABLE JACK FOR AUTOMOBILES
Filed May 26, 1937 4 Sheets-Sheet 4
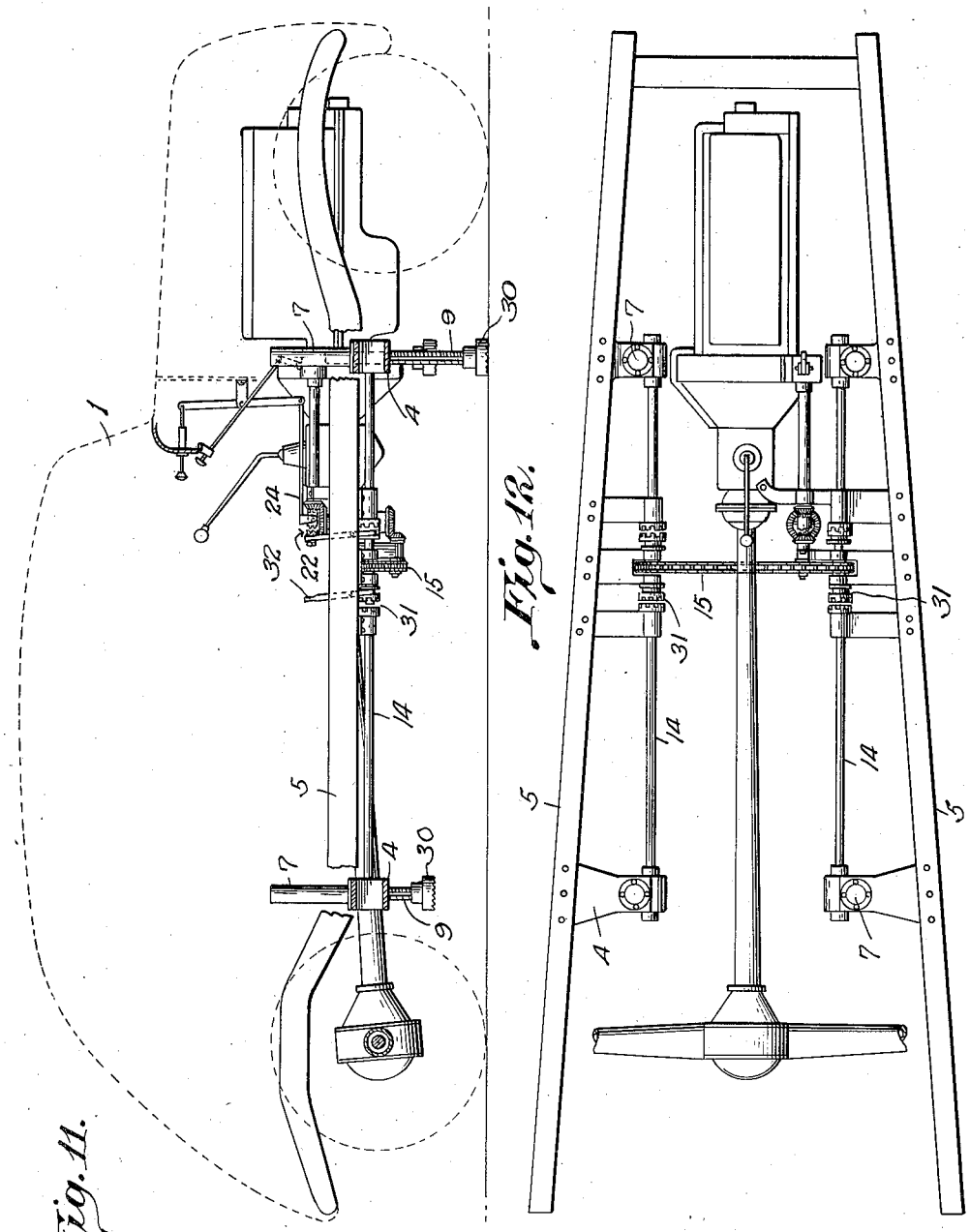
Alfonso Carlini,
INVENTOR
BY Victor J. Evans & Co.
ATTORNEYS Patented May 2, 1939

2,156,582

UNITED STATES PATENT OFFICE 2,156,582

TURNING TABLE JACK FOR AUTOMOBILES

Alfonso Carlini, Dawson, N. Mex.

Application May 26, 1937, Serial No. 144,924

1 Claim. (Cl. 254—87)

This invention relates to a jack mechanism for motor vehicles and has for the primary object the provision of a device of this character which when adapted to a motor vehicle remains a part thereof and is actuated by power obtained from the engine of a vehicle under convenient control of the driver so that the vehicle may be elevated with all wheels free of the ground or may be made to elevate any one of the wheels from the ground while the other wheels remain in engagement with the ground.

Another object of the invention is the provision of means whereby the vehicle may be conveniently turned to face any direction desired when elevated by the device.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, showing a motor vehicle equipped with a jack mechanism constructed in accordance with my invention.

Figure 2 is a plan view, partly in section, showing the mounting of the jack mechanism on the frame of the vehicle.

Figure 3 is a fragmentary longitudinal sectional view showing means whereby the vehicle when elevated by the jack mechanism may be turned to face any direction desired.

Figure 4 is a detail sectional view taken on the line 4—4 of Figure 3.

Figure 5 is a fragmentary plan view showing gearing for connecting the power drive on the pedestal of the turntable of the device.

Figure 6 is a fragmentary sectional view showing a portion of the drive for conveying power from the engine to the jack mechanism.

Figure 7 is a fragmentary transverse sectional view showing how the invention is connected with the fly wheel of the engine.

Figure 8 is a fragmentary vertical sectional view showing the means for connecting and disconnecting the drive with the fly wheel of the engine.

Figure 9 is a sectional view taken on the line 9—9 of Figure 2.

Figure 10 is a fragmentary sectional view showing a chain drive between power shafts of the jack mechanism.

Figure 11 is a vertical sectional view showing a modified form of my invention and adapted on a motor vehicle.

Figure 12 is a top plan view showing the modified form of my invention secured on the frame of the motor vehicle.

Referring in detail to the drawings, the numeral 1 indicates a motor vehicle, 2 the engine thereof and 3 the ground wheels.

Brackets 4 are secured on the frame 5 of the motor vehicle and have mounted thereon spaced bearings 6 and also include housings 7. Feed nuts 8 operate between the bearings 6. The feed nuts mesh with feed stems 9 slidable through the bearings and may enter the housings 7 when in their uppermost positions. The feed stems have secured to their lower ends a turn table 10 in the form of a skeleton frame and which is journaled on a pedestal 11. Anti-friction bearings 12 are provided between the pedestal and the turn table. Normally the feed stems are positioned so as to support the turntable and pedestal clear of the ground or any obstructions that are on the ground and may be passed over by the vehicle.

The feed nuts 8 include worm gears which mesh with worms 13 secured on shafts 14. The shafts 14 are rotatably supported in the brackets 4 and are connected together by a sprocket chain 15. Each shaft 14 operates a pair of feed stems 9.

Power shafts 16 and 17 are journaled on the vehicle and enter the fly wheel housing of the engine and have splined thereto gears 18 which may be moved into and out of mesh with the teeth on the fly wheel of the engine by control levers 19.

Arranged at right angles to the power shafts and journaled on the vehicle are shafts 20 and 21. Reversible gear type clutches 22 connect the shafts 20 and 21 to the power shafts 16 and 17. The clutches 22 have controls 23 and 24 mounted on the vehicle in such a way that the operator may conveniently actuate the clutches from a driving position. A shaft 25 is geared to the shaft 20 and has a sprocket gear 26 secured thereon over which is trained the sprocket chain 15. A shaft 27 is journaled on the turntable 10 and is geared to the shaft 21, so that the shaft 27 rotates with the shaft 21 but is capable of endwise movement independently of said shaft 21, that is to say, the shaft 27 has a gear 27' splined thereon and in mesh with a peripherally grooved driving gear 21' which is pinned or otherwise fixedly secured on the shaft 21. A gear 28 is secured on the shaft 27 and meshes with teeth formed on the periphery of the pedestal. Thus it will be seen that power may be obtained from the engine of the vehicle for raising and lowering the vehicle and for rotating the turntable on the pedestal when the vehicle is elevated so that said vehicle may be made to head in any direction selected.

Referring to my modified form of invention the turntable and pedestal are omitted from the feed stems and the latter are equipped with feet 30 to render each feed stem a jack element. In this modified form of my invention the shafts 14 are sectional, as clearly shown in Figure 12 and clutch elements 31 are provided for connecting and disconnecting the sections of the shafts 14 and include sprocket gears over which the sprocket chain 15 is trained. Thus it will be seen that the modified form of my invention permits any one of the feed stems to be operated independently of the others which will permit any one of the wheels of the vehicle to be elevated from the ground and lowered into engagement with the ground while the other wheels of the vehicle remain on the ground.

The clutches 31 are controlled by levers 32.

Having described the invention, I claim:

A carried jacking mechanism for motor vehicles comprising, a turntable, a pedestal rotatably mounted on the under side of said turntable, rectangularly disposed vertical feed stems supportingly attached at their lower ends to said turntable, means for supporting said stems on the vehicle frame with provision for relative vertical movement therebetween, said means including gears held against vertical movement relative to the vehicle and having operable connection with said stems whereby to effect longitudinal movement of the stems upon rotation of the gears, parallel shafts connected to said gears for rotating them in either direction, sprocket gears on said shafts connected by a common drive chain, a power shaft driven by the engine of the vehicle, a driving sprocket gear engaging said driving chain, a manually controlled reversible clutch mechanism for selectively connecting said power shaft to said driving sprocket gear, a vertical shaft journaled on said turntable and having a gear connection with the pedestal for effecting rotation of the turntable on the pedestal, a parallel driving shaft journaled on the vehicle frame and having compensating driving gear connection with said vertical shaft on the turntable whereby said shafts are rotatable together but one is movable endwise independently of the other, and a second power shaft driven by the engine of the vehicle and including a manually controlled reversible clutch mechanism driving said vertical driving shaft in either direction.

ALFONSO CARLINI.